United States Patent
Lin

(10) Patent No.: US 7,611,109 B2
(45) Date of Patent: Nov. 3, 2009

(54) ELECTRONIC DEVICE HANGING MECHANISM

(75) Inventor: Chang-Cheng Lin, Toujhou Village (TW)

(73) Assignee: Hannspree, Inc., Taipei (TW)

( * ) Notice: Subject to any disclaimer, the term of this patent is extended or adjusted under 35 U.S.C. 154(b) by 81 days.

(21) Appl. No.: 11/907,468

(22) Filed: Oct. 12, 2007

(65) Prior Publication Data

US 2008/0035812 A1 Feb. 14, 2008

Related U.S. Application Data

(62) Division of application No. 11/269,695, filed on Nov. 9, 2005, now abandoned.

(30) Foreign Application Priority Data

May 27, 2005 (TW) .............................. 94208847 U

(51) Int. Cl.
*A47B 96/00* (2006.01)
(52) U.S. Cl. .............................. 248/222.52; 248/224.7
(58) Field of Classification Search ........... 248/222.52, 248/223.41, 224.7, 225.11, 221.11, 221.12, 248/222.11, 222.12, 222.13, 317, 323, 324, 248/917; 411/546; 403/109.3, 109.6, 109.8, 403/353; 211/113, 116, 86.01, 87.01, 103, 211/207, 192
See application file for complete search history.

(56) References Cited

U.S. PATENT DOCUMENTS

| | | | | | |
|---|---|---|---|---|---|
| 1,093,556 | A | * | 4/1914 | Ferguson | 248/223.31 |
| 4,558,839 | A | * | 12/1985 | Kaplan et al. | 248/542 |
| 4,602,756 | A | * | 7/1986 | Chatfield | 248/223.41 |
| 5,372,346 | A | * | 12/1994 | Upchurch et al. | 248/304 |
| 5,758,742 | A | * | 6/1998 | Chiou et al. | 182/3 |
| 6,123,314 | A | * | 9/2000 | Steele | 248/681 |
| 6,892,992 | B2 | * | 5/2005 | Donahue | 248/201 |
| 7,097,143 | B2 | * | 8/2006 | Kim et al. | 248/201 |
| 2004/0232298 | A1 | * | 11/2004 | Bremmon et al. | 248/281.11 |
| 2005/0279898 | A1 | * | 12/2005 | Sweere et al. | 248/221.12 |
| 2007/0194191 | A1 | * | 8/2007 | Persson | 248/225.11 |

FOREIGN PATENT DOCUMENTS

TW 537477 6/2003

* cited by examiner

*Primary Examiner*—A. Joseph Wujciak, III
(74) *Attorney, Agent, or Firm*—Rabin & Berdo, P.C.

(57) ABSTRACT

An electronic device hanging mechanism aims to hang an electronic device on a mounting rack mounted onto a wall. The hanging mechanism includes a holding dock located in the case of the electronic device and a bracing strut movably coupled on the holding dock. The bracing strut is extendable outside the holding dock at a hanging position to be hung on the mounting rack to hold the electronic device, and received in the holding dock and hidden in the case of the electronic device at a holding position to maintain the appearance of the electronic device.

4 Claims, 10 Drawing Sheets

ELECTRONIC DEVICE HANGING MECHANISM

CROSS-REFERENCE TO RELATED APPLICATION

This is a division of U.S. application Ser. No. 11/269,695, filed Nov. 9, 2005, which claimed Priority from Taiwanese application No. 094208847, filed May 27, 2005, the entire disclosure of which is incorporated herein by reference.

BACKGROUND OF THE INVENTION

1. Field of Invention

The present invention relates to an electronic device hanging mechanism, and particularly to a hanging mechanism for hanging a thin display such as a liquid crystal display (LCD), plasma display, or surface-conduction electronic-emitter display (SED) on a wall.

2. Related Art

In the past when people purchase television (TV) sets, the screen size was a main consideration. The TV set occupies a large space in a room, and a TV cabinet is also needed to support the TV set. The TV set is bulky and often affects the interior design. With the advance of the technology, electronic devices have become thinner and lighter. This is also true for home appliances. For instance, these days flat displays such as LCD TVs, plasma TVs and the like have been introduced to the market. The TV set has led this trend.

With the introduction of flat display, the TV set no longer is limited to being rested on a TV cabinet. It can now be matched with the interior design, and be set in or hung on a wall. Reference to a hanging apparatus for hanging a flat display on the wall can be found in Taiwan patent publication No. 537477 or FIG. 1 of the present invention. To hang a flat display 20' on the wall, first, a mounting rack 40 has to be mounted on the wall where the flat display 20' is to be hung. The mounting rack 40 has at least two mounting holes 41. Two independent hanging docks 42 are fastened to the back side of a case 22 of the flat display 20' through screws corresponding to the two mounting holes 41. Then the hanging docks 42 may be hung on the mounting holes 41 to hang the flat display 20' on the mounting rack 40.

In practice, users may choose different methods to place the flat display according to different requirements. For instance, the flat display may be held on a TV rack or hung on a wall. In addition, the bracing dock is an independent accessory. When hanging the flat display, users have to fasten the bracing dock on the backside of the case with tools. Because of the bracing dock has a certain thickness, a larger gap is formed between the flat display and the wall. If the flat display is to be held on a TV rack, for aesthetic and space reasons, the bracing dock has to be unfastened and removed with tools. Such fastening and unfastening operations cause a great deal of inconvenience for users. The removed accessories also have to be stored carefully to prevent misplace, which is troublesome.

SUMMARY OF THE INVENTION

The aforesaid conventional techniques for hanging a thin display do not fully take into account user's requirements and also do not consider the total design of the flat display, so they are not the optimal design. Therefore the present invention aims to provide an improved hanging mechanism for hanging a flat display.

The hanging mechanism according to the invention is located in an electronic device. It includes a holding dock and a bracing strut. The holding dock is located in a case on the electronic device, and is a hollow duct with a guiding slot on a wall of the holding dock and a first positioning slot and a second positioning slot on two ends of the guiding slot. In addition, the bracing strut has an outer diameter slightly smaller than the inner diameter of the holding dock and can be movably held in the holding dock. And then a pin is used, which also runs through the guiding slot, to couple the bracing strut, so the bracing strut can be moved along the guiding slot to move the pin to the first positioning slot and the second positioning slot so as to let the bracing strut can be extended outside the holding dock at a hanging position and received in the holding dock at a holding position. The bracing strut further has a latch groove on a distal end of the bracing strut. When the bracing strut is at the hanging position, it can be hung on a mounting rack through the latch groove for hanging the electronic device. On the other hand, when the bracing strut is at the holding position, it is retracted into the case of the electronic device without extending outside of the case.

The electronic device hanging mechanism of the present invention can be directly located in the case of the electronic device. Besides, the bracing strut can be selectively moved to the holding position for storing the bracing strut or the hanging position for hanging the electronic device. When adopted for the flat display, it can quickly hang the flat display on the wall. The gap between the flat display and the wall is smaller. The hanging mechanism may also be hidden according to user's requirements. It is an optimal design for hanging the flat display.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

The electronic device hanging mechanism according to the present invention aims to hang a flat display such as a liquid crystal display (LCD), plasma display panel (PDP), or surface-conduction electronic-emitter display (SED) on a wall. The electronic device is not limited to the flat display. Any human-machine interface to be hung on a wall can adopt the technique disclosed in the present invention. The following discussion is based on embodiments of the flat display.

First Embodiment

Figure 1:
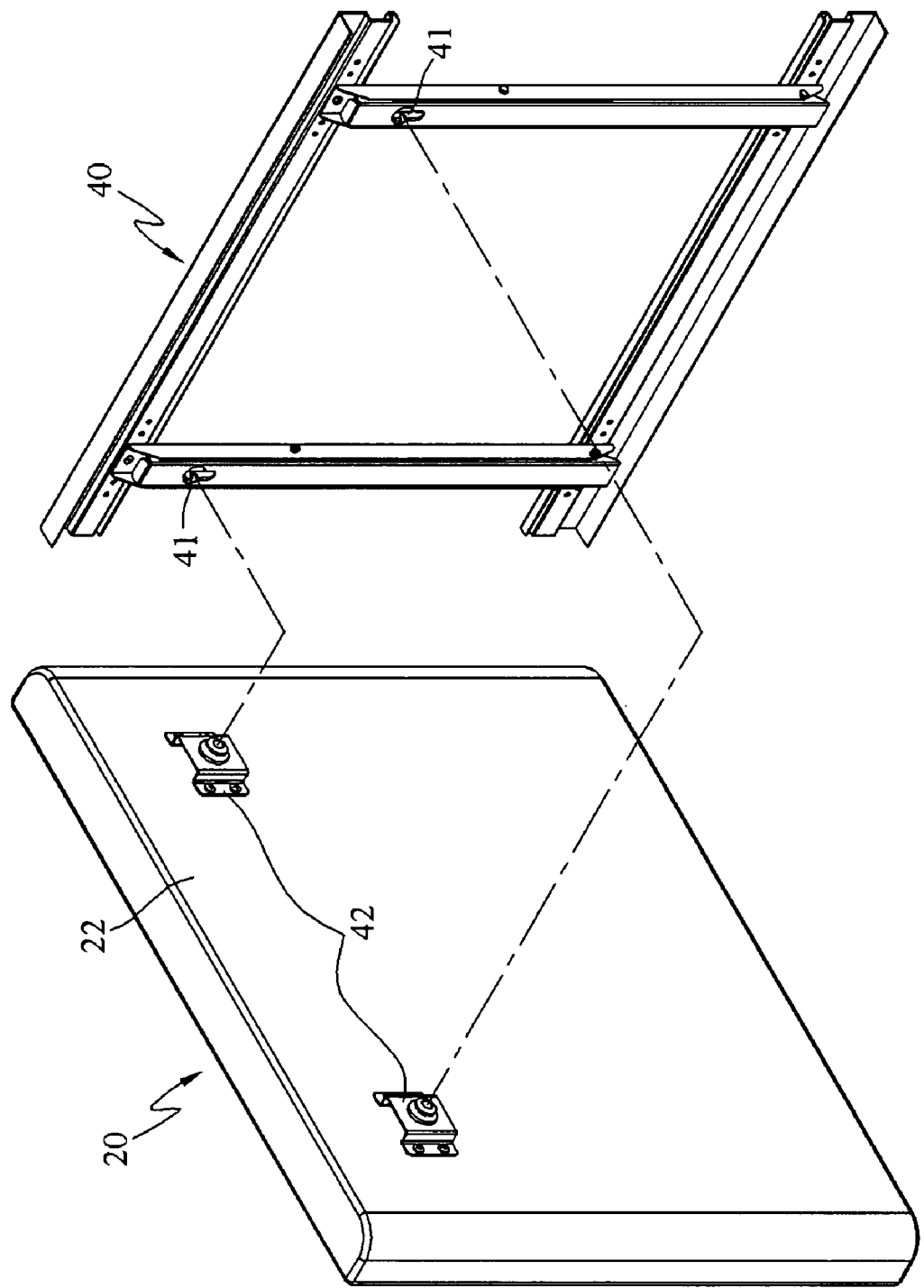
FIG. 1 is a schematic view of a conventional hanging mechanism for hanging a flat display on a wall.
Figure 2:
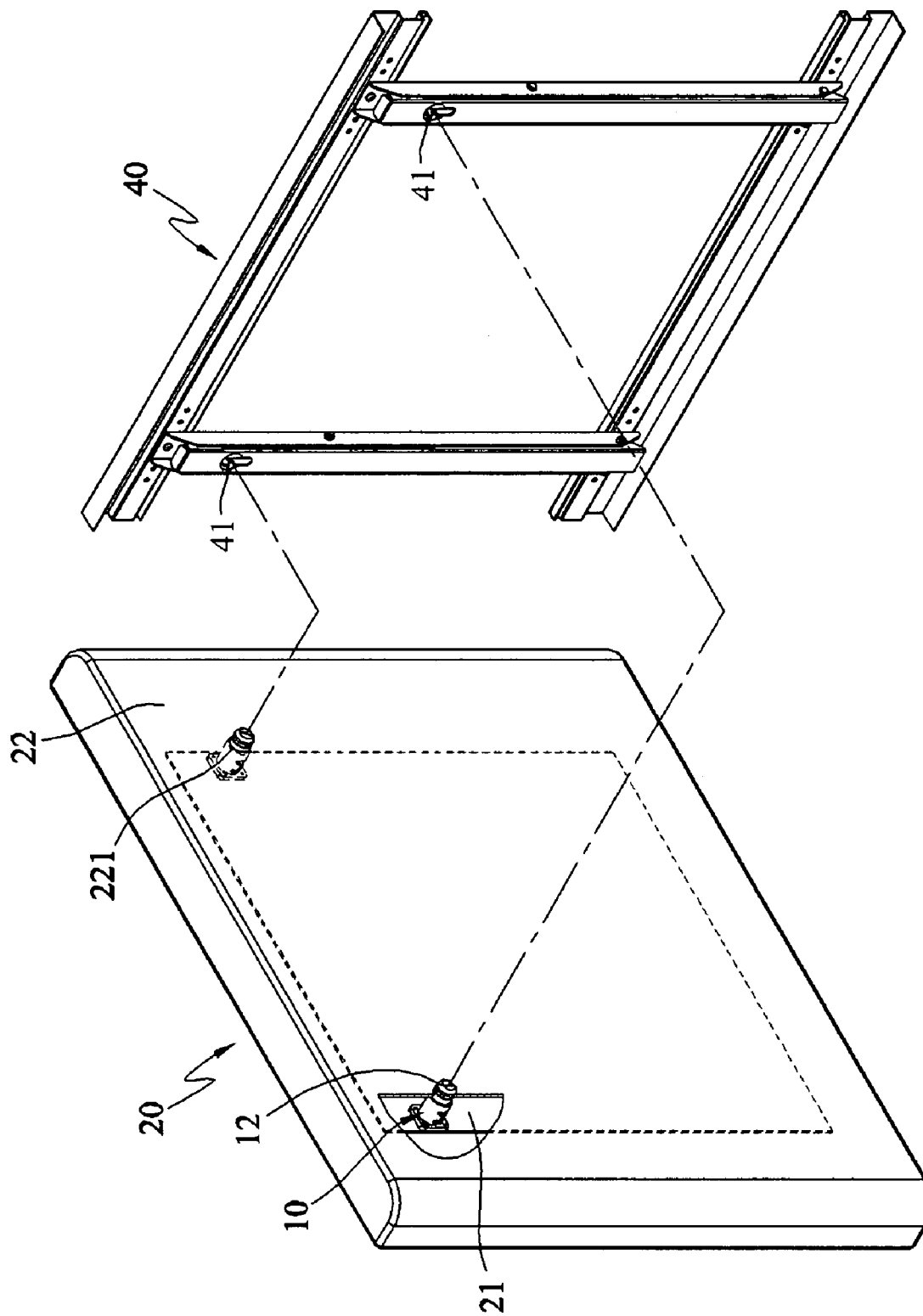
FIG. 2 is a schematic view of a first embodiment of the present invention showing the relationship between an electronic device and a mounting rack.
Figure 3:
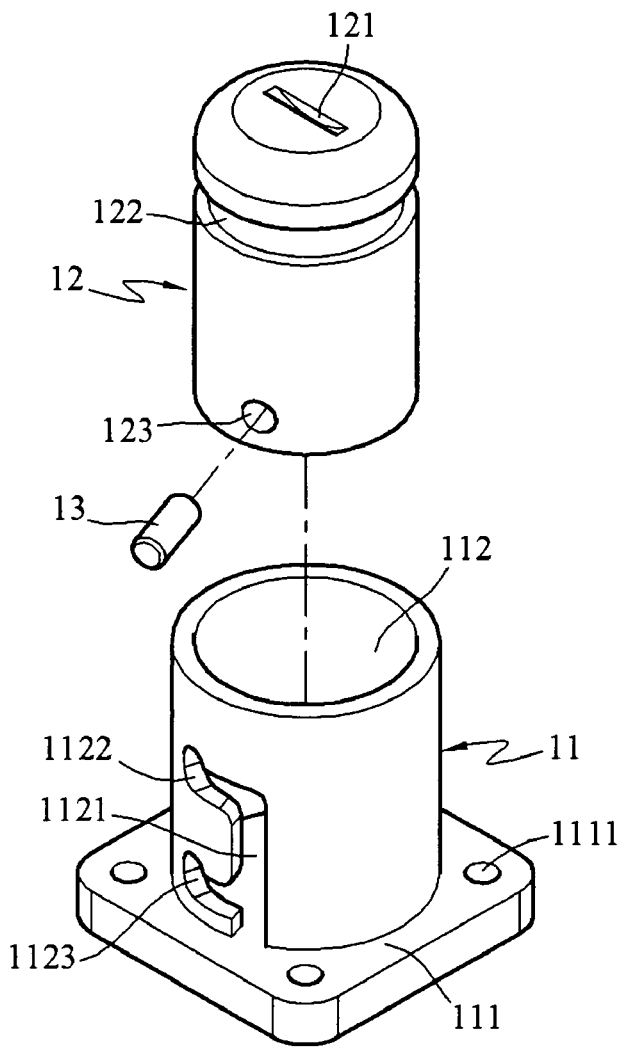
FIG. 3 is an exploded view of the first embodiment of the present invention.
Figure 5A:
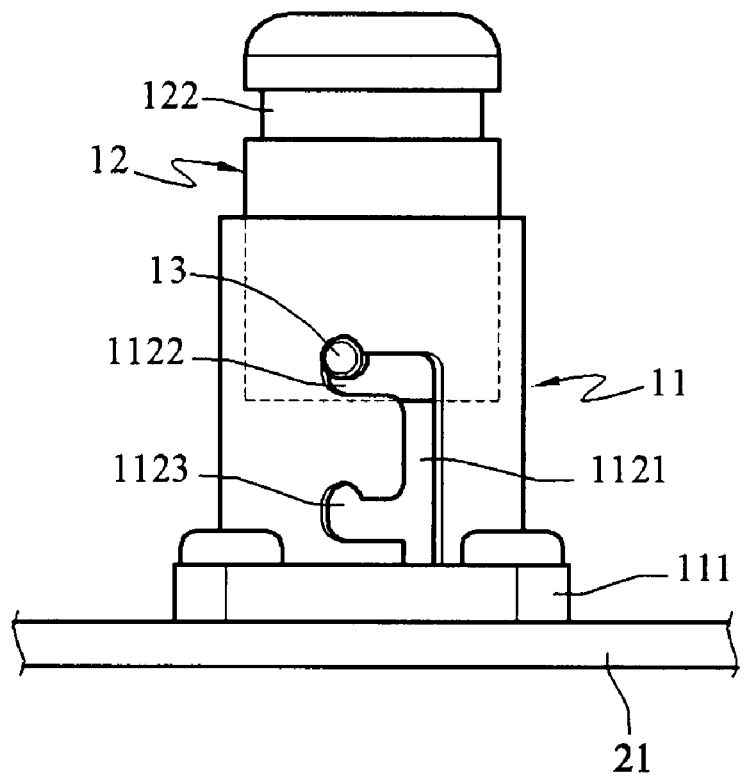
FIGS. 5A and 5B are schematic views of the first embodiment of the present invention in operating conditions.

Referring to FIG. 2, according to a first embodiment of the electronic device hanging mechanism of the present invention, an electronic device 20 includes a base rack 21 to hold electronic elements (not shown in the drawing) of the electronic device 20. The electronic device 20 is covered by a case 22 to protect the electronic elements contained inside. The case 22 has a plurality of apertures 221 formed on desired locations according to the base rack 21. The hanging apparatus 10 of the electronic device hanging mechanism of the present invention includes a holding dock 11 (shown in the FIG. 3) and a bracing strut 12. Referring to FIG. 3, the holding dock 11 includes a base 111 and a hollow duct 112. The base 111 has a plurality of holes 1111 to receive a plurality of screws (not shown in the drawings) to fasten the holding dock 11 to the base rack 21 (shown in the FIG. 5A) on the corresponding apertures 221 of the case 22. One end of the hollow duct 112 is extended from the base 111. Another end of the hollow duct 112 has an opening. The hollow duct 112 has an axial guiding slot 1121 on a tubular wall of the duct 112 and a first positioning slot 1122 and a second positioning slot 1123 extended transversely from two ends of the guiding slot 1121.

Figure 4:
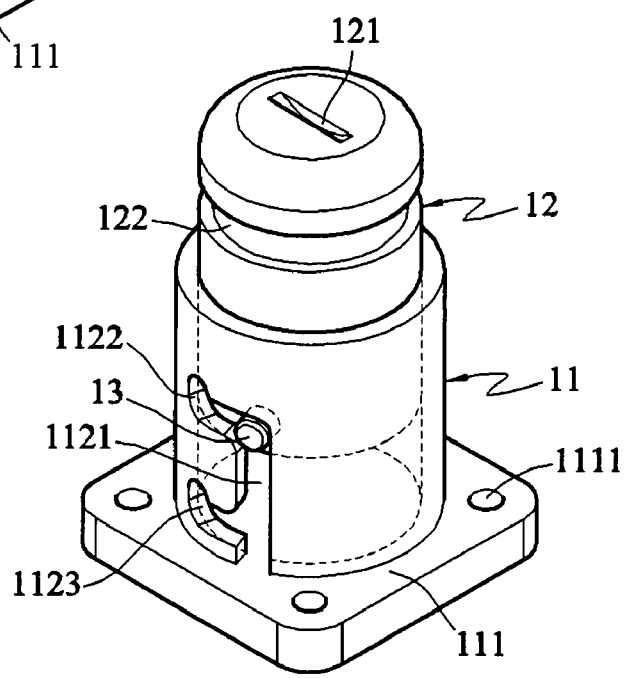
FIG. 4 is a perspective view of the first embodiment of the invention.

As shown in FIG. 4, the bracing strut 12 is cylindrical and has an outer diameter slightly smaller than the inner diameter of the hollow duct 112. The bracing strut 12 further includes an insertion trough 121 on one end, an annular latch groove 122 adjacent to the edge of the end having the insertion trough 121, and a pin hole 123 on a desired location of another end of the tubular wall corresponding to the insertion trough 121.

Figure 5B:
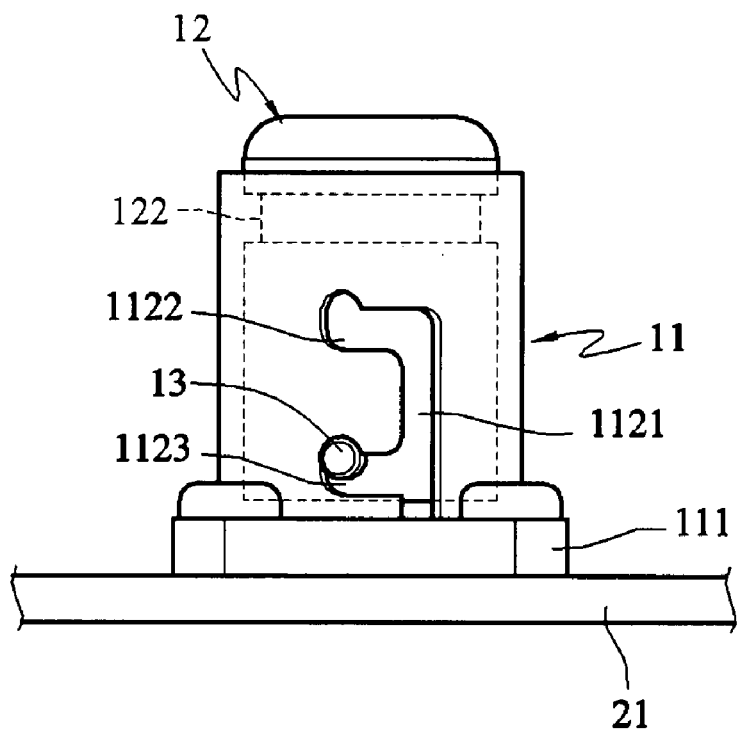

Please referring to FIGS. 3 and 4 again, the bracing strut 12 is movably coupled into the hollow duct 112 of the holding dock 11 with the pin hole 123 corresponding to the guiding slot 1121 and a pin 13 inserted into the pin hole 123. The pin 13 is inserted firmly into the pin hole 123 by tight coupling caused by the caliber difference between the pin 13 and the pin hole 123 or other bonding means. Thereby the bracing strut 12 can be moved along the guiding slot 1121 without escaping from the hollow duct 112. Also, the bracing strut 12 can let the pin 13 move into the corresponding positions of the first positioning slot 1122 or second positioning slot 1123. Then turn the bracing strut 12 to move the pin 13 into the first positioning slot 1122 or second positioning slot 1123 to prevent the bracing strut 12 from moving further. When the pin 13 is located in the first positioning slot 1122, the bracing strut 12 is extended outside the hollow duct 112 at a hanging position (referring to FIG. 5A). On the other hand, when the pin 13 is located in the second positioning slot 1123, the bracing strut 12 is retracted into the hollow duct 112 at a holding position (referring to FIG. 5B).

Figure 6A:
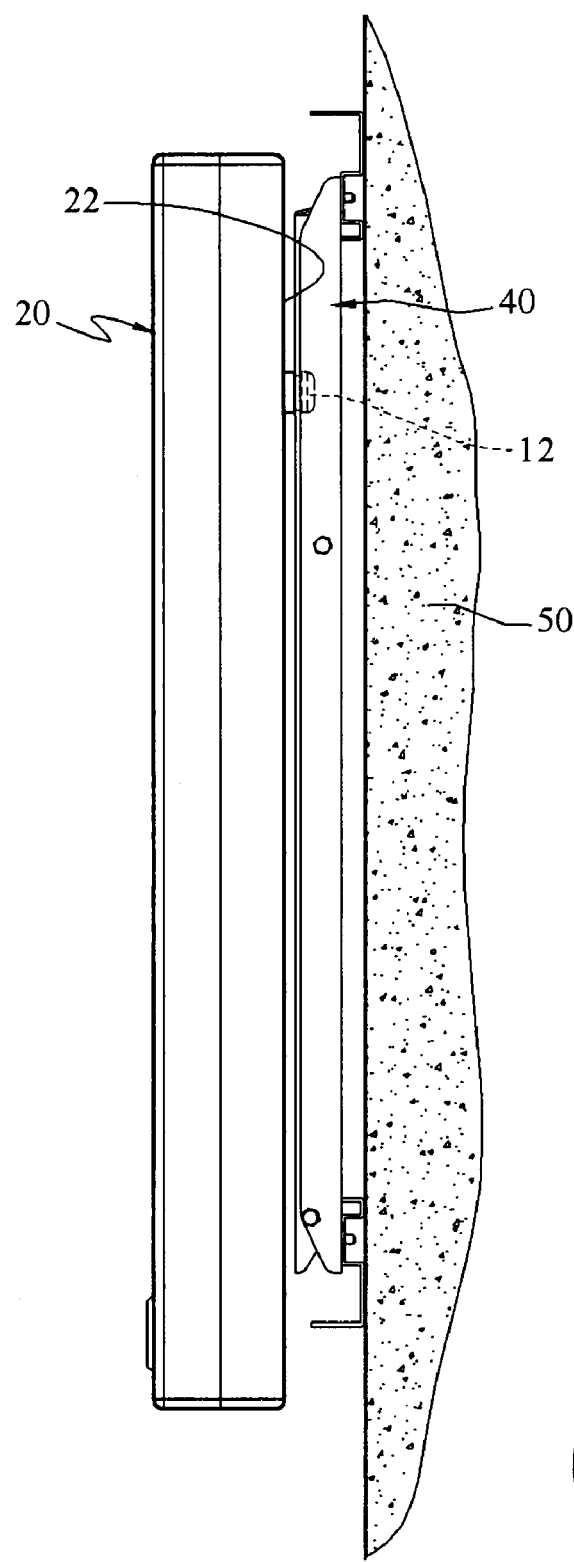
FIGS. 6A and 6B are schematic views of the first embodiment of the present invention adopted for use on an electronic device.
Figure 6B:
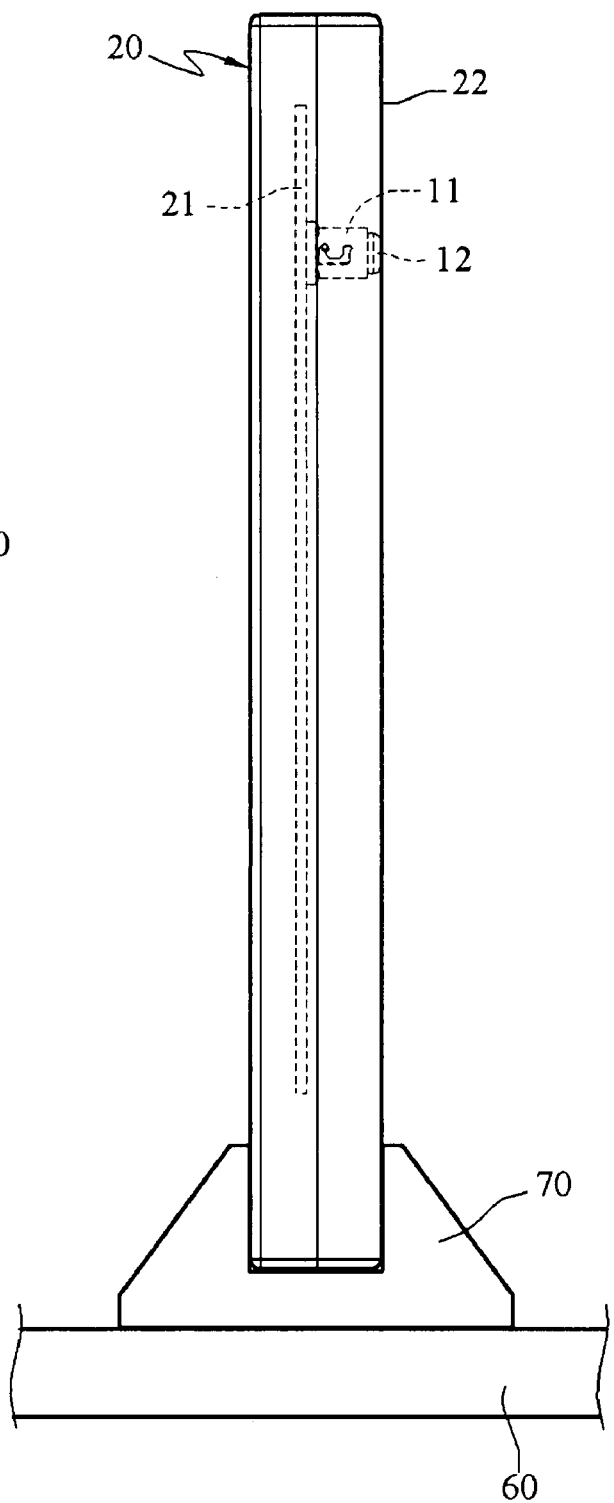

Further, as shown in the FIGS. 2, 6A, and 6B, a plurality of the hanging apparatus 10 is installed in the case 22 of the electronic device 20. The bracing strut 12 corresponds to the aperture 221 of the case 22 at the holding position. When in use for hanging the electronic device 20 on a wall 50, a mounting rack 40 has to be mounted onto the wall 50 first. Then turn the bracing strut 12 by inserting a tool in the insertion trough 121 and turning. The bracing strut 12 can be moved from the holding position and extended outside the case 22 to the hanging position. Then the electronic device 20 can be hung on the mounting rack 40 by coupling the latch groove 122 of the bracing strut 12 on the mounting rack 40. When a user wants to put the electronic device 20 on a desk 60, the user can remove the electronic device 20 from the mounting rack 40, turn the bracing strut 12 from the hanging position to the holding position, and then the bracing strut 12 is retracted and hidden into the case 22. The electronic device 20 can be stood on the desk 60 by resting on a pedestal 70.

Figure 7A:
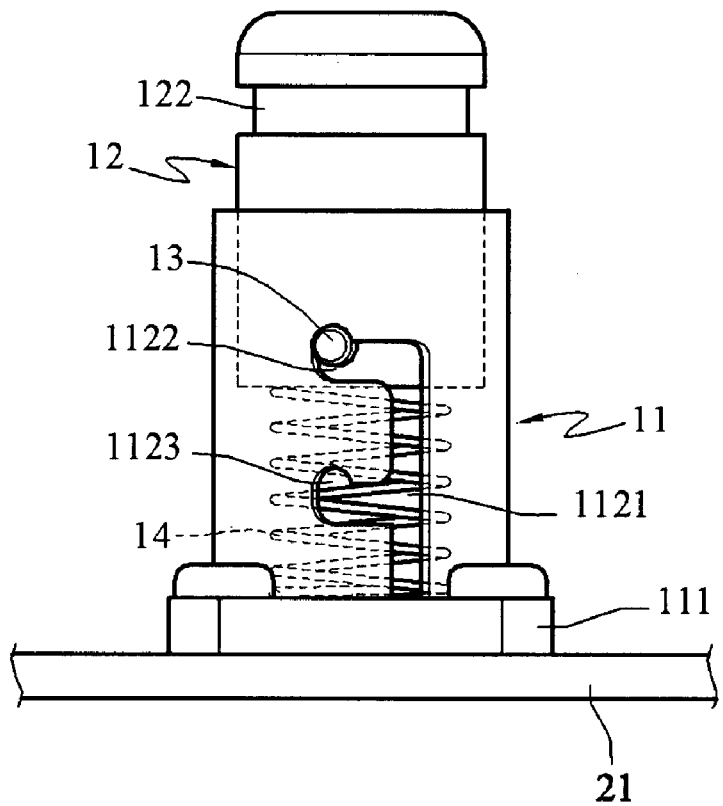
FIGS. 7A and 7B are schematic views of the first embodiment of the present invention included an elastic element in operating conditions.
Figure 7B:
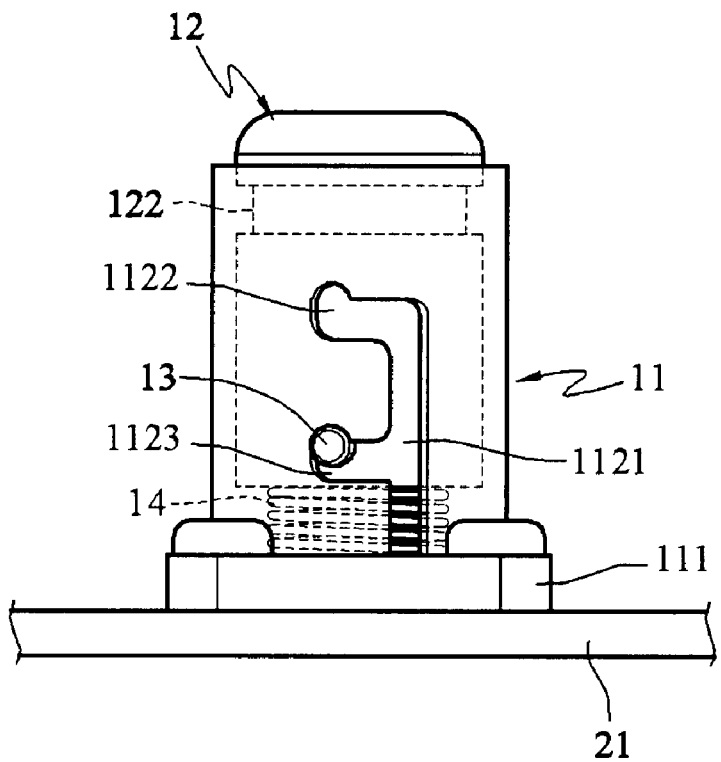

As shown in the FIGS. 7A and 7B, an elastic element 14 may be included between the bracing strut 12 and the holding dock 11 to push the bracing strut 12 to the hanging position in normal conditions. When the bracing strut 12 is moved from the hanging position to the holding position, the bracing strut 12 compresses the elastic element 14. On the other hand, when at the holding position, turn the bracing strut 12 to move the pin 13 from the second positioning slot 1123 to the guiding slot 1121. The elastic element 14 can push the bracing strut 12 to the hanging position.

Second Embodiment

Figure 8A:
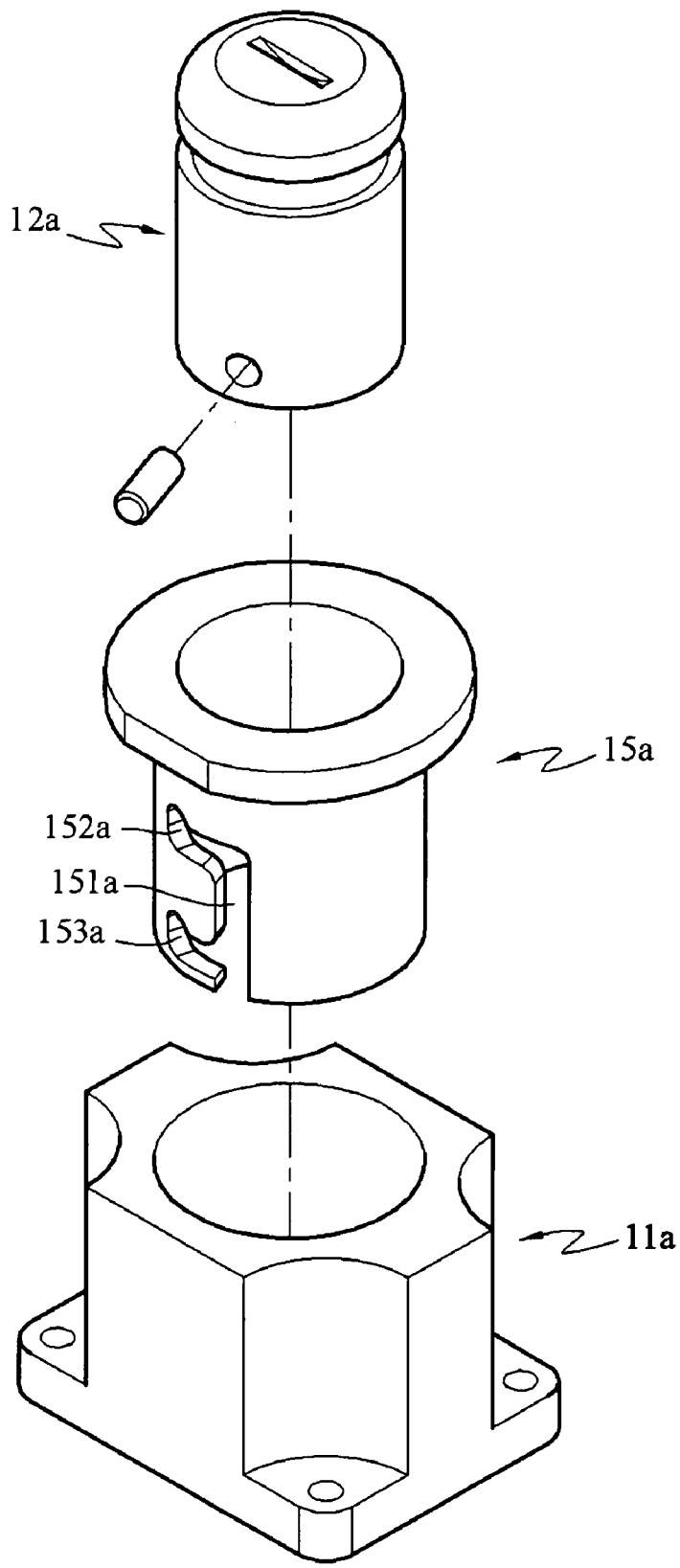
FIGS. 8A and 8B are schematic views of a second embodiment of the present invention.
Figure 8B:
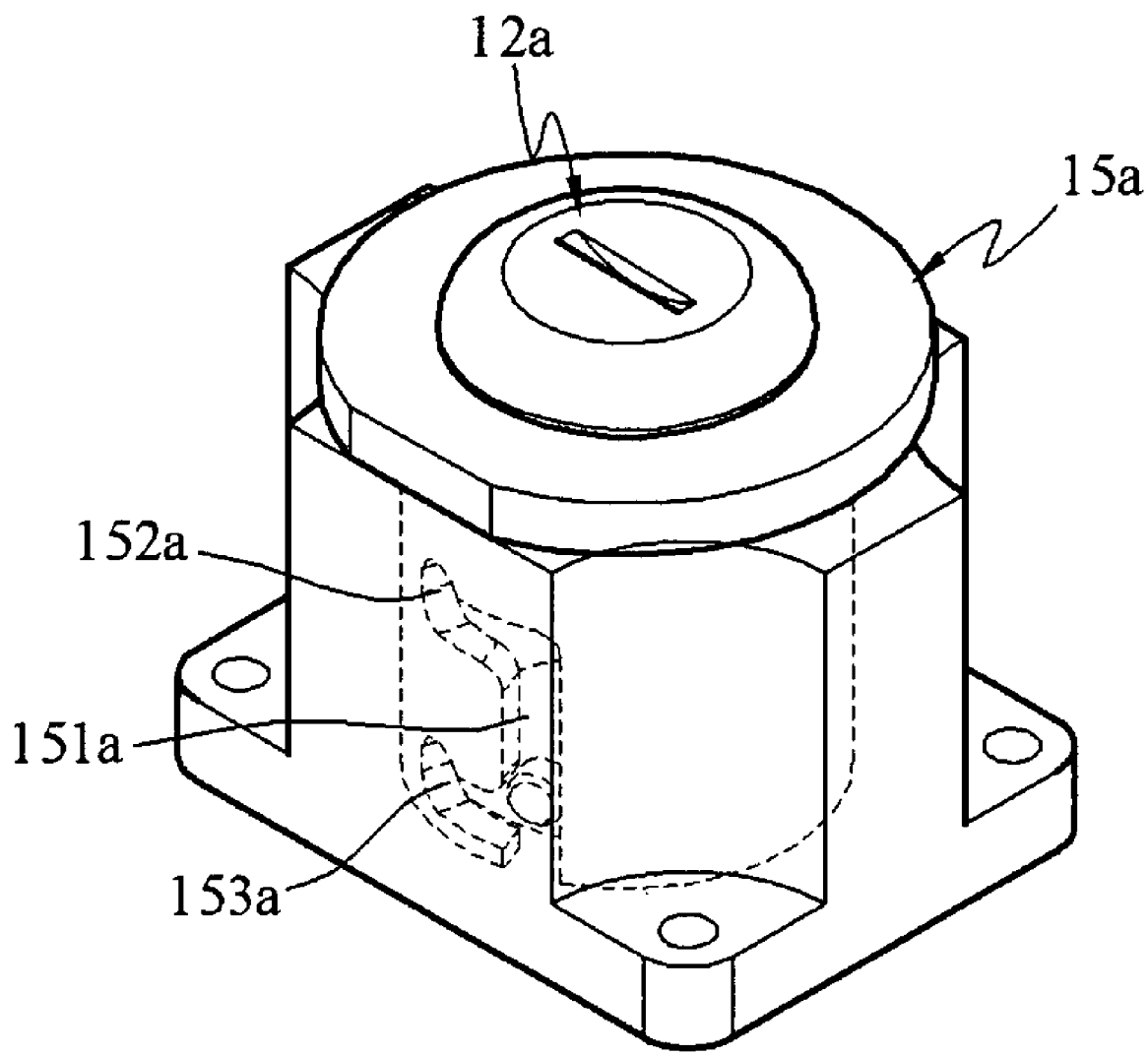

Referring to FIGS. 8A and 8B, for a second embodiment of the present invention, an electronic device hanging mechanism includes a holding dock 11a, a bracing strut 12a and a barrel 15a.

Compared with the first embodiment previously discussed, the second embodiment adds the barrel 15a with a guiding slot 151a, a first positioning slot 152a and a second positioning slot 153a. First, the bracing strut 12a is inserted into the barrel 15a and bonded with a pin 13a. Then the barrel 15a is inserted into the holding dock 11a. Such structure also can hide the bracing strut 12a. The rest of the mechanism and the operation method are the same as the first embodiment, so details are omitted.

Third Embodiment

Figure 9A:
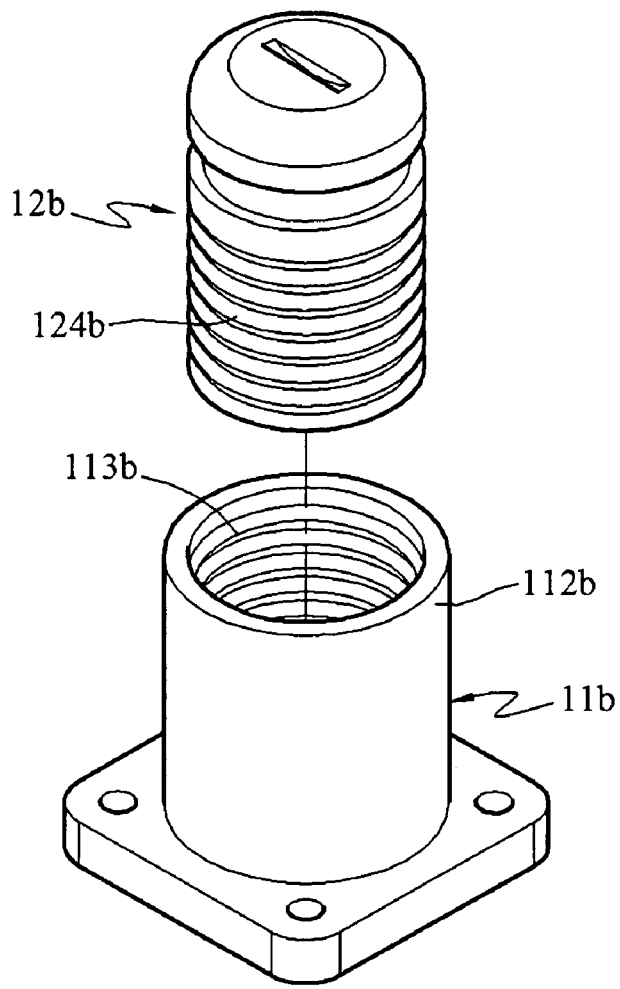
FIGS. 9A and 9B are schematic views of a third embodiment of the present invention.
Figure 9B:
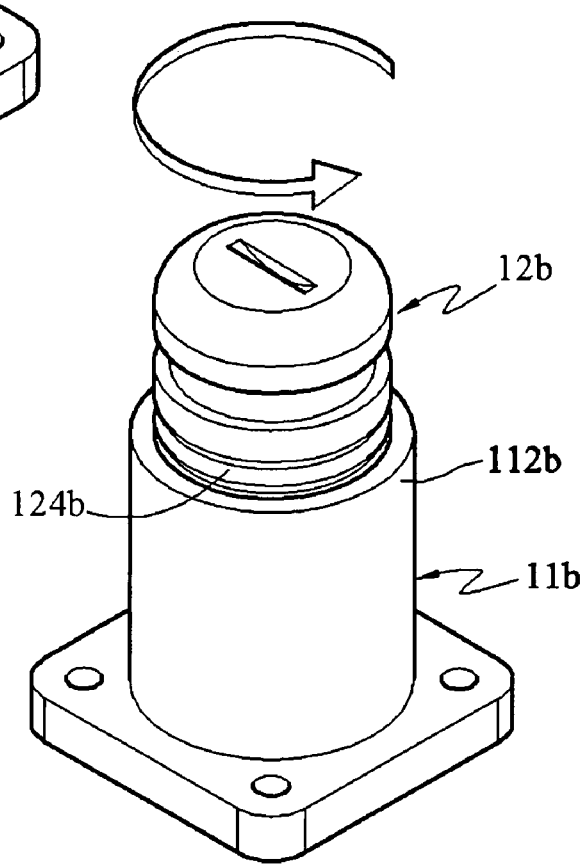

As shown in the FIGS. 9A and 9B, for a third embodiment of the present invention, an electronic device hanging mechanism includes a holding dock 11b and a bracing strut 12b. The holding dock 11b includes a hollow duct 112b with internal screw threads 113b on the inner wall and the bracing strut 12b has external screw threads 124b on the peripheral surface, so the bracing strut 12b can be turned and then inserted into the holding dock 11b by engaging the internal screw threads 113b with the external screw threads 124b. It also can be implemented by using a tool into the insertion trough 121b to turn the bracing strut 12b. Hence the bracing strut 12b can be fully sunk into the holding dock 11b at the holding position, or be extended outside the holding dock 11b by turning to the hanging position.

Fourth Embodiment

Figure 10A:
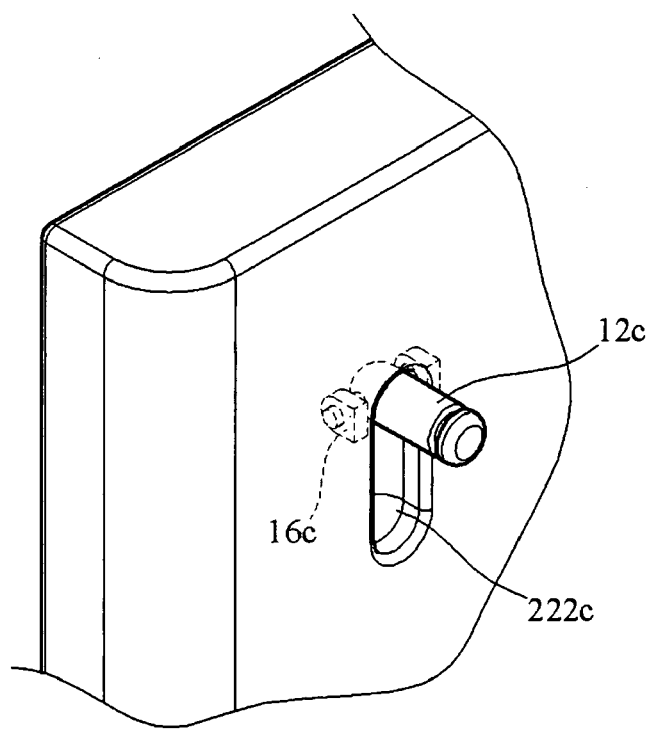
FIGS. 10A and 10B are schematic views of a fourth embodiment of the present invention.
Figure 10B:
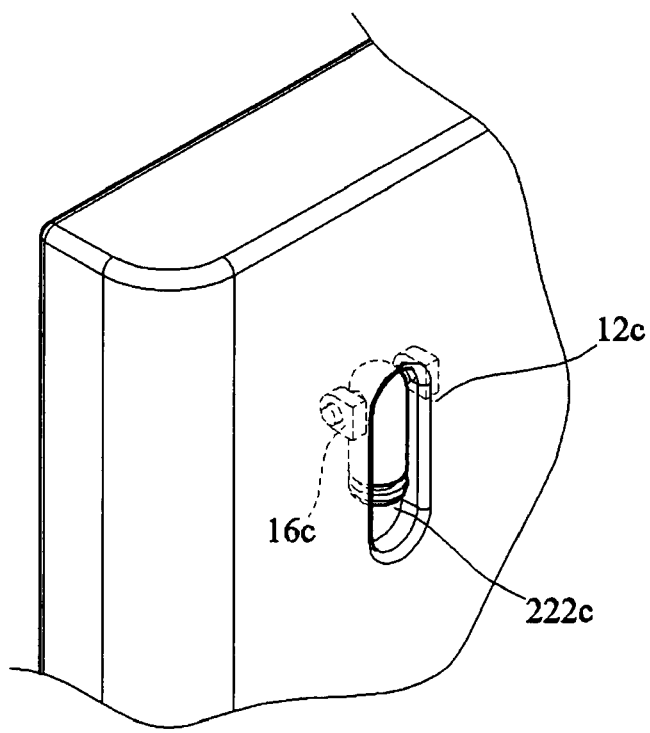

As shown in the FIGS. 10A and 10B, for a fourth embodiment of the present invention, an electronic device hanging mechanism includes a pivot seat 16c and a bracing strut 12c. The pivot seat 16c is mounted onto the base rack 21. The case 22 includes a slot 222c corresponding to the pivot seat 16c. One end of the bracing strut 12c is pivotally coupled on the pivot seat 16c in a rotatable manner. Hence the bracing strut 12c may be closed to and held in the slot 222c at the holding position (referring to FIG. 10B), or be moved upright on the case 22 and extended outside the slot 222c at the hanging position. Thus it can also hide the bracing strut 12c.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hanging mechanism installable on a case of an electronic device for hanging the electronic device on a mounting rack, comprising:
    a holding dock locatable in the case of the electronic device;
    a barrel which is coupled with the holding dock and has a guiding slot on a tubular wall thereof, a first positioning slot and a second positioning slot being located on two respective ends of the guiding slot; and
    a bracing strut which is movably coupled on the barrel and having a pin fastened thereto, the pin extending through the guiding slot, the bracing strut being movable along the guiding slot by way of the pin to the first positioning slot and the second positioning slot so that the bracing strut is respectively extendable to project beyond the barrel to allow the bracing strut to extend outside the case at a hanging position in a first position thereby allowing the bracing strut to be hung on the mounting rack, and is retractable within the holding dock in a second position so as to be hidable within the case at a holding position supported by pedestal on a fixed surface.

2. The hanging mechanism of claim 1, further having an elastic element interposed in an internal space between the holding dock and the bracing strut for pushing the bracing strut.

3. The hanging mechanism of claim 1, wherein the bracing strut has an insertion trough on an upper end surface to receive an external force to turn the bracing strut.

4. The hanging mechanism of claim 1, wherein the bracing strut has a latch groove adjacent to an upper end to hang on the mounting rack.

* * * * *